United States Patent
Durham et al.

(10) Patent No.: US 8,286,238 B2
(45) Date of Patent: Oct. 9, 2012

(54) METHOD AND APPARATUS FOR RUN-TIME IN-MEMORY PATCHING OF CODE FROM A SERVICE PROCESSOR

(75) Inventors: David M. Durham, Beaverton, OR (US); Hormuzd M. Khosravi, Portland, OR (US); Travis Schluessler, Hillsboro, OR (US); Ravi Sahita, Beaverton, OR (US); Uday R. Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 11/540,373

(22) Filed: Sep. 29, 2006

(65) Prior Publication Data
US 2008/0083030 A1    Apr. 3, 2008

(51) Int. Cl.
*H04L 29/06* (2006.01)

(52) U.S. Cl. .................. 726/22; 726/2; 726/3; 713/187; 713/189; 713/1; 713/2; 717/106; 717/110; 717/111; 717/168; 717/169; 717/170; 717/173; 717/174; 717/176; 717/178

(58) Field of Classification Search ......................... None
See application file for complete search history.

(56) References Cited

U.S. PATENT DOCUMENTS

| | | | |
|---|---|---|---|
| 5,579,522 A * | 11/1996 | Christeson et al. ............... 713/2 |
| 6,112,304 A * | 8/2000 | Clawson ....................... 713/156 |
| 6,202,208 B1 * | 3/2001 | Holiday, Jr. ................... 717/166 |
| 6,317,880 B1 * | 11/2001 | Chamberlain et al. ........ 717/174 |
| 6,363,524 B1 * | 3/2002 | Loy ................................ 717/170 |
| 6,397,385 B1 * | 5/2002 | Kravitz ........................ 717/173 |
| 6,438,621 B1 * | 8/2002 | Kanamori et al. ............ 719/331 |
| 6,546,553 B1 | 4/2003 | Hunt |
| 6,658,657 B1 | 12/2003 | Lueh |
| 6,832,374 B2 * | 12/2004 | Yen et al. ...................... 717/173 |
| 7,020,874 B2 * | 3/2006 | Sokolov et al. ................ 717/166 |
| 7,162,710 B1 * | 1/2007 | Edwards et al. ............... 717/111 |
| 7,421,698 B2 * | 9/2008 | Fresko ........................... 719/310 |
| 7,424,705 B2 * | 9/2008 | Lewis et al. ................... 717/148 |
| 7,571,442 B2 * | 8/2009 | Van Der Spuy ............... 719/315 |
| 7,577,951 B2 * | 8/2009 | Partamian et al. ................ 718/1 |
| 7,590,864 B2 * | 9/2009 | Khan et al. .................... 713/189 |

(Continued)

FOREIGN PATENT DOCUMENTS
KR     2006-15969     2/2006

(Continued)

OTHER PUBLICATIONS
CN PTO, "Office Action", Chinese Patent Application No. 200710192992.2 mailed Dec. 31, 2008, 5 pages.

(Continued)

*Primary Examiner* — Syed A. Zia
(74) *Attorney, Agent, or Firm* — Blakely, Sokoloff, Taylor & Zafman LLP

(57) ABSTRACT

Methods and apparatuses enable in-memory patching of a program loaded in volatile memory. A service processor identifies a program to be patched and an associated patch for the program. The patch is loaded into memory, including applying relocation fix-ups to the patch. The service processor directs the program to the patch in place of the segment of the program to be patched. The program implements the patch while maintaining program state, and without suspending execution of the program.

23 Claims, 5 Drawing Sheets

U.S. PATENT DOCUMENTS

| | | | |
|---|---|---|---|
| 7,603,663 B2* | 10/2009 | Wu et al. | 717/151 |
| 7,644,404 B2* | 1/2010 | Rao et al. | 717/169 |
| 7,647,586 B2* | 1/2010 | Long et al. | 717/129 |
| 7,784,044 B2* | 8/2010 | Buban et al. | 717/168 |
| 7,788,661 B2* | 8/2010 | Axnix et al. | 717/168 |
| 7,886,287 B1* | 2/2011 | Davda | 717/168 |
| 7,890,946 B2* | 2/2011 | Blumfield et al. | 717/171 |
| 7,984,304 B1* | 7/2011 | Waldspurger et al. | 713/187 |
| 7,984,432 B2* | 7/2011 | Edlund | 717/168 |
| 8,015,558 B1* | 9/2011 | Beloussov et al. | 717/168 |
| 8,055,096 B2* | 11/2011 | Dahms et al. | 382/282 |
| 8,156,487 B2* | 4/2012 | Blumfield et al. | 717/172 |
| 2003/0212983 A1* | 11/2003 | Tinker | 717/110 |
| 2004/0107416 A1* | 6/2004 | Buban et al. | 717/170 |
| 2004/0237073 A1* | 11/2004 | Wu et al. | 717/154 |
| 2005/0026603 A9* | 2/2005 | Rajaram | 455/419 |
| 2005/0108578 A1* | 5/2005 | Tajalli et al. | 713/201 |
| 2005/0223291 A1* | 10/2005 | Zimmer et al. | 714/34 |
| 2005/0273857 A1* | 12/2005 | Freund | 726/23 |
| 2006/0026408 A1* | 2/2006 | Morris et al. | 712/239 |
| 2006/0037013 A1 | 2/2006 | Kang | |
| 2006/0069912 A1* | 3/2006 | Zheng et al. | 713/151 |
| 2006/0135230 A1* | 6/2006 | Godse et al. | 463/1 |
| 2006/0174226 A1* | 8/2006 | Fair et al. | 717/127 |
| 2006/0277540 A1 | 12/2006 | Bhattacharya | |
| 2006/0288341 A1* | 12/2006 | Wurden et al. | 717/168 |
| 2006/0294498 A1* | 12/2006 | Partamian | 717/106 |
| 2009/0100416 A1* | 4/2009 | Brown et al. | 717/153 |

FOREIGN PATENT DOCUMENTS

| WO | WO-0106798 | 1/2001 |
|---|---|---|

OTHER PUBLICATIONS

EP PTO, "Office Action", European Patent Application No. 07253875.4, mailed Nov. 6, 2008, 3 pages.

EP communication dated May 20, 2008 for EP Application No. 07253875.4-2211.EP).

Extended EP Search Report dated Jan. 28, 2008 for EP Application No. 07253875.4-2211.

Lyu, et al.: A Procedure-Based Dynamic Software Update, Proceedings of the Int'l Conference on Dependable Systems and Networks, DSN 2001; G Teborg, Sweden, Jul. 1-4, 2001, IEEE Computer Soc. US, pp. 271-280 XP001042420, ISBN: 0-7695-1101-5.

CN PTO, "Second Office Action", Chinese Application No. 200710192992.2, Mailed Aug. 14, 2009, 5 pages.

CN PTO, "Third Office Action", Chinese Patent Application No. 200710192992.2; Mailed Dec. 18, 2009, whole document.

KR PTO, "First Office Action", Korean Patent Application No. 10-2007-98980, Mailed Sep. 1, 2009, whole document.

Notification of Granting a Patent Right mailed Nov. 25, 2010 for Chinese Patent Application No. 200701092992.2.

Decision to Refuse and Minutes of Oral Proceedings in European Patent Application No. 07253875.4, mailed March 4, 2011, 13 pages.

European Search Report mailed May 2, 2011 for EP Application No. 10012701.8-2211.

"Summons to attend oral proceedings issued by the European Patent Office Appiication No. 07253575.4", (Sep. 6 2011), Whole Document.

* cited by examiner

```
1:  // example code         PROGRAM 510
2:
3:  #include "header.h"
4:
5:  int main(int argc, char* argv[]) {
6:      int i;
7:      char charstring[10];           // Small buffer
8:      for(i=0;argv[0][i]!=NULL;i++) {  // No bounds checking!
9:          charstring[i]=argv[0][i];     // Possible overflow!
0040104A  mov    edx,dword ptr [ebp+0Ch]
0040104A  jmp    (0080104A)          // Inline replacement
0040104D  mov    eax,dword ptr [edx]
0040104F  mov    ecx,dword ptr [ebp-4]
00401052  mov    edx,dword ptr [ebp-4]
00401055  mov    al,byte ptr [eax+edx]
00401058  mov    byte ptr [ebp+ecx-10h],al
10:     }
11:
12:     return 0;
13: }

[PATCH]
9:      if(i==10) break;              // Fix overflow
0080104A  cmp    dword ptr [ebp-4],0Ah
0080104E  jne    (00801054)
00801050  jmp    main+4Eh (0040105E)
00801054  mov    edx,dword ptr [ebp+0Ch]  // Replace removed line
<NEW CODE>                               // Possibly insert new code here
00xxxxxx  jmp    (0040104D)          // Jump/return to program
```

```
                    PATCH 520
8:      for(i=0;argv[0][i]!=NULL;i++) {  // No bounds checking!
9:      if(i==10) break;              // Fix overflow
0040104A  cmp    dword ptr [ebp-4],0Ah
0040104E  jne    main+42h (00401052)
00401050  jmp    main+56h (00401066)
10:         charstring[i]=argv[0][i];   // Overflow corrected
00401052  mov    edx,dword ptr [ebp+0Ch]
00401055  mov    eax,dword ptr [edx]
00401057  mov    ecx,dword ptr [ebp-4]
0040105A  mov    edx,dword ptr [ebp-4]
0040105D  mov    al,byte ptr [eax+edx]
00401060  mov    byte ptr [ebp+ecx-10h],al
```

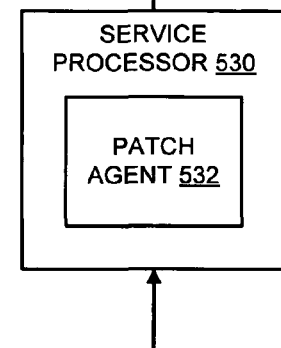

SERVICE PROCESSOR 530

PATCH AGENT 532

FIG. 5

METHOD AND APPARATUS FOR RUN-TIME IN-MEMORY PATCHING OF CODE FROM A SERVICE PROCESSOR

FIELD

Embodiments of the invention relate to digital security, and more particularly to patching a program inline in volatile memory.

BACKGROUND

Computer systems execute code that may contain vulnerabilities to attack. For example, a common attack vector of malware is to execute a script that overflows a buffer. In order to reduce susceptibility to attack, software and/or firmware developers may implement code patches for a program. Patching a program traditionally involves updating one or more files on permanent or removable storage that are associated with the program, and then reloading the program into memory to execute the patched program. Reloading the program can be accomplished through a system reboot or reset, or sometimes through simply taking down the program itself and reloading the affected program. In either case, the program experiences "down" time, in which the program execution traditionally must be suspended.

The traditional approach to patching involves loading a patching program that patches a code image on a disk prior to allowing the host operating system to execute the patched program, which is why program execution is traditionally suspended. Additionally, traditional patching methods are dependent on the host operating system, because the patching application executes on the host. Thus, different patches must traditionally be deployed for different operating systems.

Patching programs for security holes, especially for critical security holes that could, for example, enable a destructive self-propagating network worm to spread, has become an accepted inconvenience. However, rebooting a system or suspending and reloading a program do not accommodate high availability servers, in which any down time or unavailability is unacceptable. The unavailability of the system can be costly, even if unavailable for only short periods.

BRIEF DESCRIPTION OF THE DRAWINGS

The following description includes discussion of various figures having illustrations given by way of example of implementations of embodiments of the invention. The drawings should be understood by way of example, and not by way of limitation.

FIG. 5 is a block diagram of an embodiment of a service processor that applies a code patch to a program.

DETAILED DESCRIPTION

Figure 1:
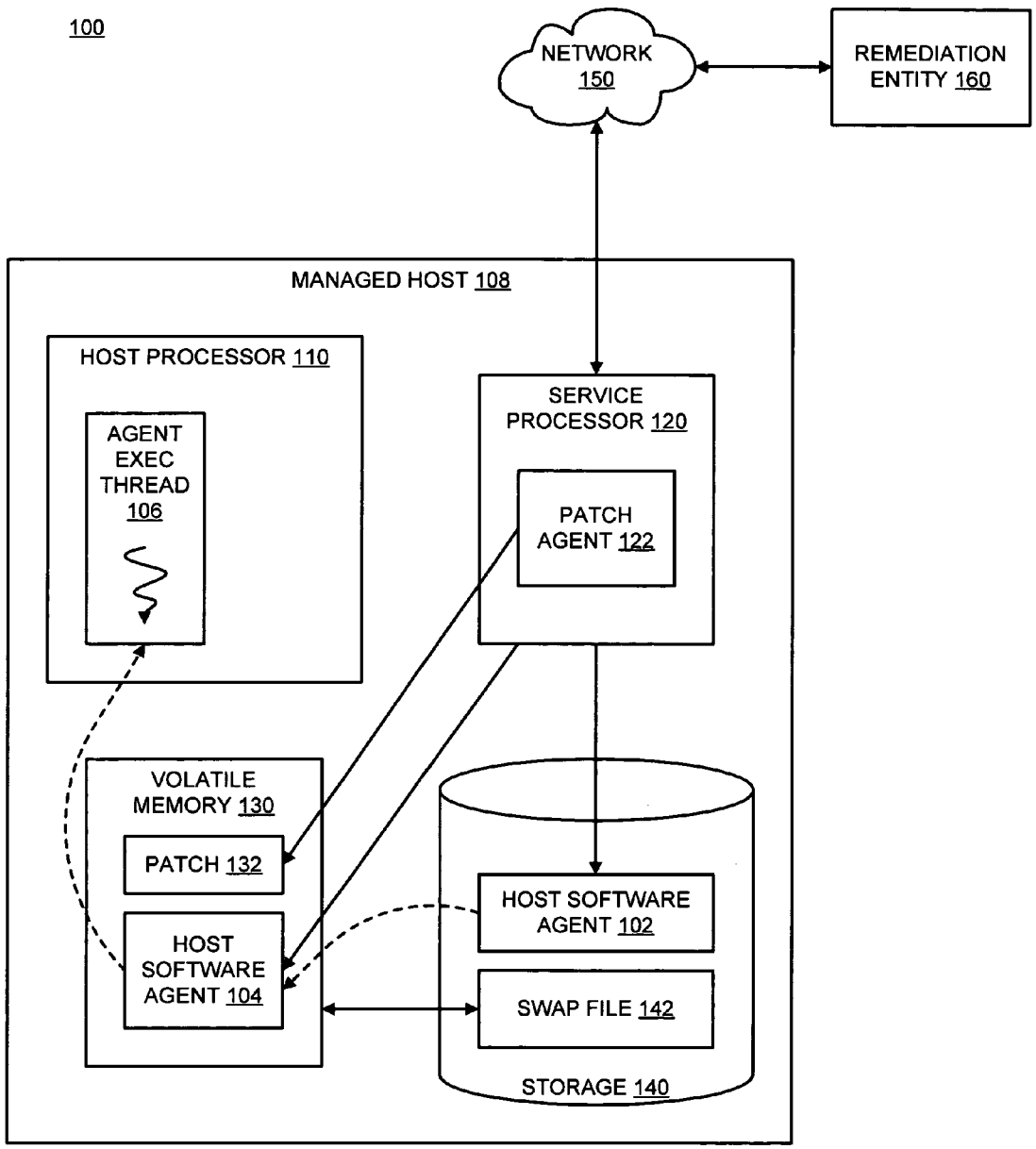
FIG. 1 is a block diagram of an embodiment of a system having a service processor with a patch agent.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A service processor is enabled to provide secure runtime in-memory patching of a program on a host. The service processor can be an isolated partition of the platform (hardware and/or software). The isolated partition is an execution environment that is securely separated from the host processor and operating system (e.g., an embedded service microprocessor, a virtual partition, ACTIVE MANAGEMENT TECHNOLOGY (AMT) of INTEL CORPORATION of Santa Clara, Calif.). The in-memory runtime patching allows the program to execute uninterrupted. The service processor patches the in-memory image of a program, instead of, or in conjunction with, patching the program image on disk and reloading the program. Because the service processor is, or is part of, an isolated partition, the patching can be performed independently of the host processor or host operating system (OS).

In one embodiment, a general process for in memory patching with a service processor is as follows. The service processor receives a patch and places the patch in memory, or receives an indication of a patch that is placed in memory by a patch source. The service processor performs relocation fix-ups on the patch to conform the memory locations indicated in the patch to the memory locations associated with the program to be patched. The service processor directs the in-memory program to the in-memory patch, which allows the patch to be applied without suspending operation of the program. Directing the program to the patch can be accomplished, for example, by in-memory instruction replacement and/or symbol table modification. In one embodiment, the service processor modifies the patch (for example, when applying relocation fix-ups) to include a jump instruction or a control flow transfer back from the patch to "good" code (i.e., an instruction sequence after the "bad" code that is being replaced) in the in-memory program. In an alternative embodiment, the patch could be compiled with knowledge of the memory locations of a program, and no fixing-up of the patch would be required. Generally, the fixing up of the patch and the addition of the jump instruction from the patch back to the program code is performed prior to directing the program to the patch. Thus, the program can continue to execute when a patch is applied. The ability to apply a patch without interruption of execution of the patched program can be particularly useful, for example, for critical applications and server platforms.

The service processor has access to host memory (i.e., main memory, or volatile memory, which may include virtual swap pages), and more particularly to host software images of programs executing from host memory. A program executing in main memory generally has an associated image that resides in a persistent state on a disk, typically in a non-volatile storage device of the host system. The program is executed by the host processor out of main memory. In one embodiment, the host system supports virtual memory. When virtual memory is supported, main memory includes memory that is volatile by nature (e.g., random access memory), as well as one or more segments or files of the storage that are managed as volatile memory through the use of memory swapping.

The service processor may perform all patching of the program, or in one embodiment, the service processor provides services to a patch executable to enable the patch to be applied in-memory while the patch executable applies the patch to the in-storage image of the program. In one embodiment, the patching program invokes the service processor (e.g., by sending a request or a command) to indicate that a patch is to be applied for an identified program. In one embodiment, a patch and a program indicator are transmitted to the service processor, which then applies the patch without a patch executable. In such a case, the service processor patches the in-memory, and the in-storage images of the program.

In one embodiment, the service processor scans main memory for a signature of an unpatched program image in response to receiving an indication that a patch should be applied to an identified program. Additionally, an administrative command can initiate the service processor scan. In one embodiment, a patchable program, or agent, registers with the service processor to provide the location on disk and in memory of the agent to the service processor. When an identified program is located, the service processor can examine the program image to determine if a section identified for remediation has been patched. For example, the service processor may receive an indication of the program of interest, the patch, and a check value to compare against the affected section. The service processor updates the identified section of the image of the program loaded in memory. The updating of the identified section in memory patches the program without requiring suspension of execution of the program.

In addition to patching, the service processor can operate in conjunction with a virus scanner or other remediation tools to determine when to patch a program. For example, a virus scanner can detect malware signatures in a program. Any malware signatures found within memory can be indicated to the service processor, which can then remove the viruses with inline remediation of the affected program. Traditional virus scanners identify malware, but have no knowledge about the infected program. The service processor can be made to scan memory and/or to operate in conjunction with a virus scanner, and revert the infected program to a non-infected image state. The program can thus be remediated without down time. Alternatively, or additionally, the service processor can report the signature to a remote administrator.

As described above, a program can be patched inline in memory. In contrast to previous methods of patching dynamic linked libraries (DLLs), rather than just modifying addresses of function calls in the program, the service processor can affect the actual code to apply a code patch. In addition to code, in one embodiment, a program has locatable data (e.g., data that may be registered with the service processor, and have an identifiable address) that can also be patched, similarly to the patching of code.

FIG. 1 is a block diagram of an embodiment of a system having a service processor with a patch agent. Managed host 108 represents an electronic system that executes programs. Managed host 108 may be, for example, a desktop computer, a laptop computer, a personal digital assistant (PDA) or other handheld computing or communication device, a server, etc. Managed host 108 includes host processor 110, which represents a processor, microcontroller, central processing unit (CPU), etc. Although shown as a single unit in FIG. 1, host processor 110 should be understood as potentially including one or more processing cores or processing units, and potentially including parallel processing capability.

Managed host 108 includes volatile memory 130, which may store/provide instructions and/or data for execution by host processor 110. Volatile memory 130 may include random access memory (RAM), for example, static RAM (SRAM), dynamic RAM (DRAM), synchronous DRAM (SDRAM), dual-data rate RAM (DDRRAM), etc. Volatile memory 130 includes a memory controller, which includes hardware and/or software that manages data stored in volatile memory 130. Volatile memory 130 is volatile because data stored in volatile memory 130 becomes invalid when power to the memory controller is interrupted. In one embodiment, volatile memory 130 includes a portion or segment of a hard disk or flash memory, which would normally be expected to be non-volatile. However, non-volatile storage may be used as a memory swapping file for virtual memory usage, and the data stored in the swap file is managed by the memory controller. The memory swapping file can be considered to be volatile as used herein because the data stored on the file is either "deleted" and/or is considered by the memory controller to be invalid when power to the memory controller is interrupted. Thus, to the extent storage is used for virtual memory purposes, the segment of storage used can be considered to be volatile memory.

Managed host 108 also includes storage 140, which represents non-volatile storage to store persistent data. Non-volatile storage refers to a medium of storage that retains its value even when power is removed from the storage. Persistent data refers to data that is desired to be retained when power is interrupted to managed host 108, for example, system files, operating system(s), program files, configuration files, etc. Storage 140 can include disks and associated drives (e.g., magnetic, optical), universal serial bus (USB) storage devices and associated ports, flash memory, read only memory (ROM), non-volatile semiconductor drives, etc. In one embodiment, storage 140 includes swap file 142, which represents a virtual memory partition, or a segment of storage used for virtual memory purposes, as described above. From the perspective of a user or a host agent loaded into memory, the user or agent may not distinguish between pages of a program loaded into volatile memory that are actually residing in volatile memory 130 and those pages that may be temporarily reside on swap file 142.

Storage 140 includes host software agent 102, which represents an image of a software program. Host software agent 102 is loaded into volatile memory 130 as host software agent 104 (a loaded image of the software agent in storage). Note that as mentioned above, some or all of the pages of host software agent 104 may be physically in volatile memory 130, or in swap file 142 that is managed as volatile memory by the memory controller of volatile memory 130. Note that pages of the program can still reside as host software agent 102 in storage. For example, with an implementation that uses demand paging, code is not generally placed in volatile memory until it is needed for execution. Additionally, software agent pages may not be placed in swap file 142 when paged out, unless the page is marked as dirty (i.e., it has been modified). In such a case, when a page is marked not present and is subsequently requested, it is generally reloaded from the host software agent 102 image in storage 140.

Loaded software agent 104 is executed by host processor 110. Thus, host processor 110 is shown as having agent execution (exec) thread 106. Agent execution thread 106 represents an executing image of part or all of host software agent 102 (stored in storage 140) and loaded as host software agent 104 in volatile memory 130. There may be any number of agents executing on host processor 100 (within the capability of the processor and/or other resources (e.g., memory, network bandwidth) within managed host 108). The host software agent may be any type of software program, kernel, executable thread, etc. For example, host software agent 102 may be antivirus software, an intrusion detection system (IDS), a firewall, OS executable code, data, or function pointers that do not change, etc.

Errors can and do exist in code for software programs, also referred to herein as software agents. When an error is detected, the error may be handled by providing a patch for the software agent. A patch refers to a new instruction, routine, or other segment of the software agent for which the patch applies. A patch could also be implemented as an entirely new binary and/or supporting files; however, the core changes in the binary can be understood as a new instruction or routine as mentioned above. The patch will be used to replace part of the software agent of interest. A patch is traditionally applied by the deployment of a patch on a system with a patch program or executable that installs the patch, or changes the software agent code in storage. As described herein, patch 132 represents a patch for host software agent 104 that is loaded in memory 130. In contrast to the traditional approach, patch 132 is placed in memory, and host software agent 104 is patched while still in memory, without interruption of host software agent 104. Additionally, the patch may be applied to host software agent image 102 of storage 140, but reloading of the patched host software agent 102 into memory 130 is not necessary to continue to execute host software agent 104 in a patched state.

Managed host 108 includes service processor 120, which represents hardware and/or software that provides management of managed host 108 independent of host processor 110. Service processor 120 is an isolated partition, as described above, to provide an execution environment that is securely separated from the host processor and operating system(s) executing on the host processor. For example, service processor 120 may be a microprocessor and/or other circuitry embedded on a hardware platform of managed host 120 (e.g., a motherboard). Service processor 120 can provide monitoring services to detect viruses or other malware, or hacker breach of managed host 108. Service processor 120 includes patch agent 122, which represents hardware and/or software that provides in-memory patching for managed host 108. As described above, in-memory patching may include the placing of patch 132 in memory, and directing host software agent 104 of volatile memory 130 to patch 132 without interrupting execution of host software agent 104.

Service processor 120 can also register host software agent 104 and/or other programs loaded in volatile memory 130. Registering host software agent 104 includes identifying host software agent 104 with a program identifier. In addition to the program identifier, service processor 120 generally stores other information about registered agents, for example, memory locations, program hashes, or other information that can verify the identity and/or integrity of a program in volatile memory 130. In an embodiment where host software agent 104 is registered with service processor 120, service processor 120 may monitor host software agent 104 for expected behavior, and may actively scan the agent for errors. Additionally, service processor 120 could actively scan an administrative or service location on a network to "watch" for patches or updates that may come available for host software agent 104. Alternatively, service processor 120 can receive a request to patch host software agent 104, and/or detect an error in host software agent 104 in conjunction with a periodic scan of volatile memory 130.

In one embodiment, service processor 120 has a secure network connection via network 150. Network 150 represents any type of network with associated hardware and software components. Network 150 can include one or more of a local area network (LAN), wireless LAN (WLAN), wide area network (WAN), metropolitan area network (MAN), global area network (GAN) such as the Internet, or any combination thereof. The connectivity hardware may include Category-5 or other twisted pair cable, coaxial cable, wireless communication transceivers, etc., as well as flow direction hardware (e.g., interface circuits/cards, switches, routers, servers). In one embodiment, managed host 108 is connected to network 150 (connection not shown), and service processor 120 has a connection to network 150 that is out-of-band as related to host processor 110 and any operating systems executing on host processor 110. An out-of-band connection is a connection that is inaccessible and/or not visible to software executing on host processor 110.

In one embodiment, network 150 is coupled to remediation entity 160, which represents an administrative entity of system 100 (e.g., an administrative server or workstation). Remediation entity 160 may enforce or otherwise administer network security policy on network 150, especially as related to managed host 108. In one embodiment, remediation entity 160 represents an administrative entity, and service processor 120 reports patching procedures to remediation entity 160. Service processor 120 may report all patches, or alternatively, may report only unsuccessful attempts to apply patches (i.e., some patches may not succeed). Service processor 120 may also indicate malware signatures found in host software agent 104. Other information may also be passed to remediation entity 160.

In one embodiment, service processor 120 provides relocation fix-ups to patch 132. Relocation fix-ups are offsets that indicate an actual location in memory where a function call or other routine call or program call can be found in memory. For example, the executable code of host software agent 102 is generally written with a default value provided for a default memory location to find a called function from a DLL. In operation the actual location in memory of the DLL function call is likely to be somewhere other than the default location indicated in the executable code store. Thus, when host software agent image 104 is loaded into volatile memory 130 by a loader of the memory management, the loader provides the relocation fix-up values to enable host software agent 104 to make the function call. Similarly, service processor 120 applies relocation fix-ups to patch 132 to enable patch 132 to be executable in volatile memory 130. An image of patch 132 with default memory locations may be stored in storage 140, which would automatically be fixed up by the loader if the program were reloaded into volatile memory 130.

As one example of an embodiment of operation of service processor 120 with patch agent 122, consider the case of software worms. Worms typically infect a system due to a buffer overflow. Buffer overflows occur due to improper bounds checking on a dynamic data structure within a program. A buffer overflow or similar vulnerability can be corrected by providing a bounds check in a separate memory region, redirecting the portion of the program with the incorrect binary image (i.e., that does not provide proper bounds checking) to the added bounds check, and then directing the control flow back to the original program. Consider that host software agent 104 includes an improper bounds check. Service processor 120 loads patch 132 with the proper bounds check into volatile memory 130, and redirects the flow of control of host software agent 104 from the improper bounds check to patch 132. The old, vulnerable machine code of host software agent 104 would then jump to or call the correct image in patch 132 that contains the proper bounds check for the dynamic data structure. Inline patching is enabled by service processor 120 inserting a jump call or control flow transfer instruction into the old binary image of the program in volatile memory 130, and jumping to a new set of instructions that perform the bounds check. The new code segment in patch 132, inserted by service processor 120, returns to host software agent 104 at the point of execution where the program can resume its normal instruction sequence. While managed host 108 and host software agent 104 were operating, service processor 120 is able to fully patch host software agent 104 inline.

While inline patching provides complete patching in some cases, in other cases inline patching may not be sufficient. Consider that patch 132 for host software agent 104 includes substantially different code (for example, modification of an encryption/decryption algorithm). In such a case, entire functions or portions of the original code of host software agent 104 may need to be replaced.

In such a case, service processor 120 may receive patch 132 via network 150 (e.g., from remediation entity 160). If host software agent 104 is registered with patch agent 122 of service processor 120, patch agent 122 can perform the patching. Otherwise, service processor 120 may perform a memory scan of volatile memory 130 to find the code segment of host software agent 104 that matches the particular signature of code that will be patch by patch 132. Once service processor 120 has located the host agent code to be patch, the patch can be applied directly in memory via copying the new code segments (i.e., patch 132) to volatile memory 130, and changing the appropriate symbols in the original host code of host software agent 104 to point to the new code segments of patch 132. In one embodiment, the entire patching process can be initiated via network 150, for example, from remediation entity 160 or another remote management console (not shown).

For example, if host software agent 104 included a named function printk( ) represented via the symbol_PRINT_in the host code, the function printk( ) would be indicated in a symbol table of volatile memory 130. A named function refers to a function that is referenced by a symbol. Consider that patch 132 includes a new function printk_new( ) that is intended to replace printk( ). Patch agent 122 can apply the patch by loading patch 132 to volatile memory 130 without overwriting the previous code (i.e., printk( )). Patch agent 122 then changes all references in the original host code to point to the code corresponding to printk_new( ). Because the process of loading the new code and redirecting the old code to the new function does not overwrite the original code, it allows host software agent 104 to be executing while being patched in volatile memory 130. Note that patch 132 may in turn contain references to code portions/data blocks in the original code (for example, reference to global variables). In such a case, patch agent 122 fixes up or relocates such references to match the current version that is loaded in volatile memory 130.

In either the case of inline replacement of one or more instructions, or the case of replacing a function, service processor 120 applies the patch to the program. The instruction (s) to be replaced or the function may be referred to herein as an "item" of the program or a "segment" of the program that the service processor identifies and patches. An item may also refer herein to an element of locatable data that may be patched as described herein. Note that in certain implementations, an item will be small enough to be contained in a single page of memory, while in other implementations the item will cover multiple memory pages.

As described above, a host agent program can register with service processor 120. In one embodiment, the host agent program would provide the service processor 120 with hints, such as the locations of certain symbols in volatile memory 130, as part of, or in conjunction with, registration of the host agent program. The symbol locations can be used to patch those symbols. In another embodiment, a loader of the memory management can load the host agent program code and leave extra memory space at the end of each page of host agent program code loaded in volatile memory 130, which could be used to load patch code. Alternatively, the person or entity that generates the patch could incorporate sufficient information in the patch to enable service processor 120 to determine the fixes/relocations that need to be performed on the patch code based on the location of the un-patched version in the memory.

As mentioned above, in certain embodiments, virtual memory is supported, and swap file 142 is used as a memory swap segment. In such embodiments where program pages can transitively be stored in storage 140 rather than in volatile memory 130, service processor 120 may perform additional operations as part of a patch. To perform in-line patching, service processor 120 first ensures that the program code is in volatile memory 130 prior to performing the patching, as described above. One way in which service processor 120 can ensure that the program code is loaded in volatile memory 130 is for a kernel resident agent (not shown) to receive page-in requests from service processor 120. The kernel resident agent could then generate page faults and subsequently pin code pages in memory until service processor 120 completes its patching operation(s).

Figure 2:
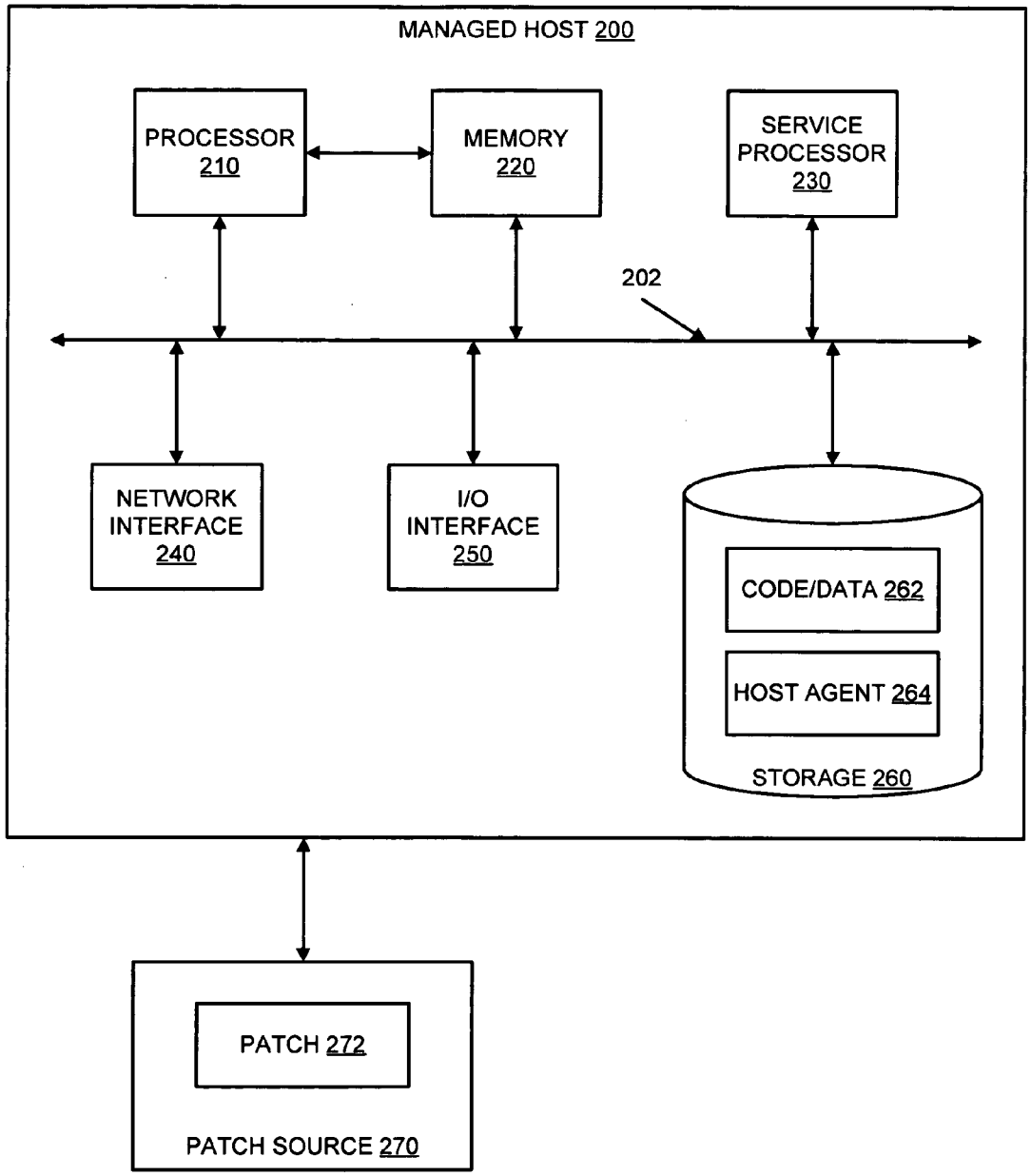
FIG. 2 is a block diagram of an embodiment of a system with a service processor that receives a patch from a patch source.

FIG. 2 is a block diagram of an embodiment of a system with a service processor that receives a patch from a patch source. Managed host 200 represents a system or host on which a program is to be patched, and may be an example of managed host 108, or any other embodiment of a system described herein. Managed host 200 may be, for example, a personal computer, handheld computer, a server, a gaming system, set-top box, etc. Managed host 200 includes one or more processors 210, and memory 220 coupled to processor 210. Processor 210 may include any type of microprocessor, central processing unit (CPU), processing core, etc., to perform operations related to message authentication and servicing of data access requests. Processor 210 controls the overall operation of managed host 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Processor 210 may include multi-core and/or multi-processor devices.

Memory 220 represents the main memory of managed host 200 to provide code or data to be executed by processor 210. Memory 220 is an example of volatile memory as described previously. Memory 220 may include one or more varieties of random access memory (RAM), for example, static RAM (SRAM), dynamic RAM (DRAM), synchronous DRAM (SDRAM), dual data-rate RAM (DDR-RAM), etc., or a combination of memory technologies. In one embodiment, a memory controller that manages memory 220 also has access to a portion of disk or flash that is managed as volatile memory. Thus, volatile memory includes the swap files of virtual memory.

Processor 210 and memory 220 are coupled to bus system 202. Bus system 202 is an abstraction that represents any of one or more separate physical buses, communication lines/ interfaces, and/or multi-drop or point-to-point connections, connected by appropriate bridges, adapters, and/or controllers. Therefore, bus system 202 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394-1995 bus, published Aug. 30, 1996, and commonly refereed to as "Firewire."

Also coupled to processor 210 through bus system 202 are one or more network interface(s) 240, one or more input/output (I/O)) interface(s) 250, and one or more internal storage device(s) 260. Network interface 240 enables managed host 200 to communicate with remote devices (e.g., a server) over a network. Network interface 240 may include, or may be, for example, an Ethernet adapter. Additionally, managed host 200 generally includes I/O interface 250 for accessibility from a human user. I/O interface 250 may include video, audio, and/or alphanumeric interface(s).

Storage 260 may be or include any conventional medium for storing data in a non-volatile or persistent manner (i.e., the value is retained despite interruption of power to managed host 200). Storage 260 includes code and/or data 262 that may be accessed and placed in memory 220 for execution by processor 210. Storage 260 includes host agent 264 that is loaded into memory 220 to be executed.

Managed host 200 includes service processor 230, which provides the ability to patch host agent 264 while loaded in memory 220. Service processor 230 can provide inline instruction replacement and/or symbol modification, as described above.

Managed host 200 is coupled to patch source 270. Patch source 270 may be internal or external to managed host 200. In an embodiment where patch source 270 is internal, patch source 270 may be coupled to bus 202. In an embodiment where patch source 270 is external, patch source 270 may be coupled to network interface 240. Patch source 270 could be coupled to a link on network interface 240 that is accessible to software executing on processor 210, and/or patch source could be coupled on a link on network interface 240 that is accessible only to service processor 230. Patch source 270 may be, for example, service processor 230 or other hardware on managed host 200, a virtual machine partition, a virtual machine manager, or software executing on processor 210, or patch source 270 may be a remote administrator, a policy enforcement point, an update website, etc. Patch source 270 provides patch 272 to be applied to host agent 264 while the host agent is loaded in memory 220.

Figure 3:
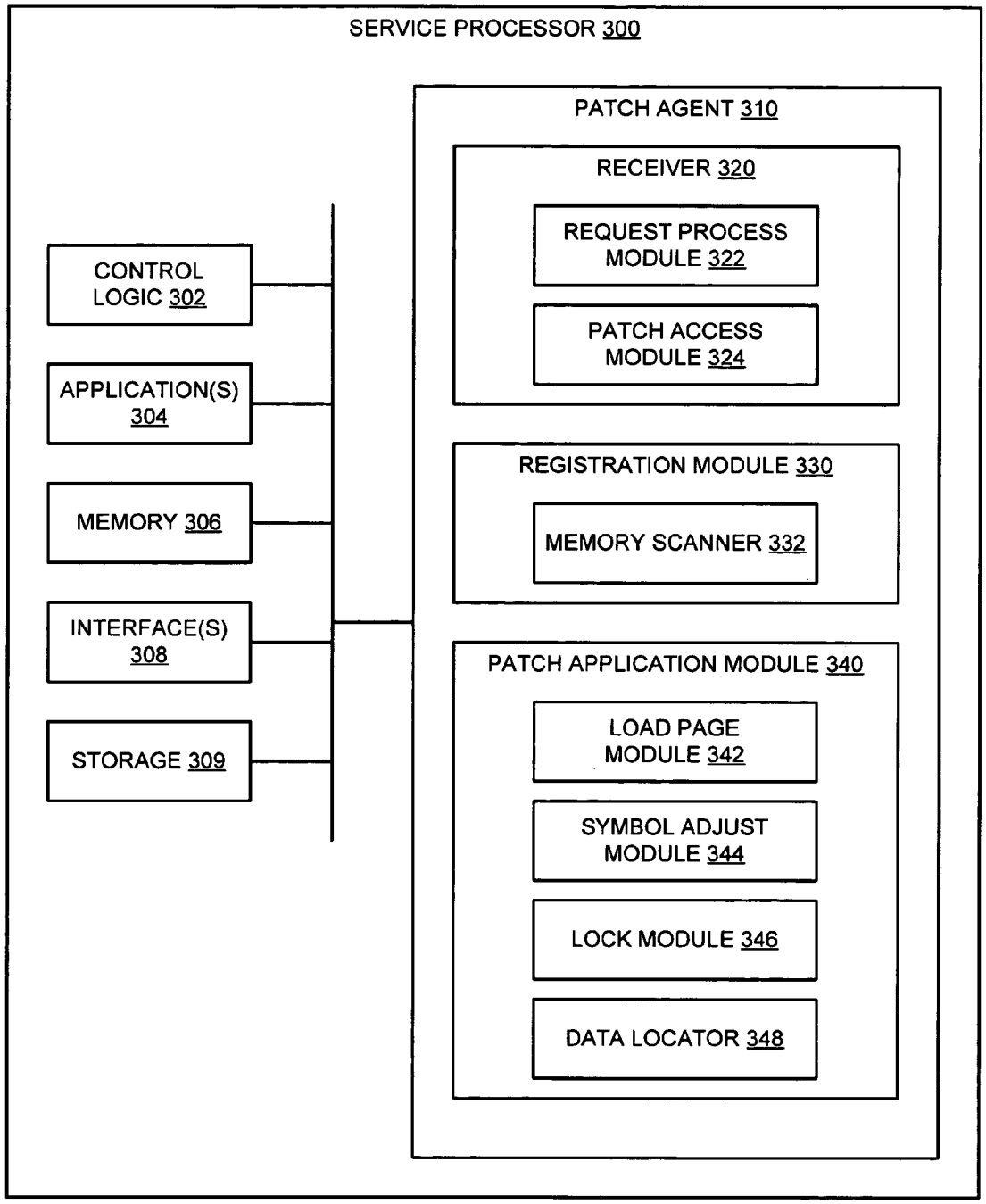
FIG. 3 is a block diagram of an embodiment of a service processor with a patch agent.

FIG. 3 is a block diagram of an embodiment of a service processor with a patch agent. Each of the components represented in service processor 300 is a means that may be implemented with hardware, software, or a combination. Service processor 300 includes control logic 302, which implements logical functional control to direct operation of service processor 300, and/or hardware associated with directing operation of service processor 300. Logic may be hardware logic circuits and/or software routines. The logic may be instructions executing on a processor of a computing device. In one embodiment, service processor 300 includes one or more applications 304, which represent code sequences and/or programs that provide instructions to control logic 302.

Service processor 300 includes memory 306 and/or access to memory resource 306 for storing data and/or instructions. Memory 306 may be separate from main memory of a managed host system in which service processor 300 resides. Thus, memory 306 may include memory local to service processor 300, as well as, or alternatively, including memory of the system on which service processor 300 resides. Service processor 300 may use memory 306, for example, to hold registration information for registered software agents. Service processor 300 also includes one or more interfaces 308, which represent access interfaces to/from (an input/output interface) Service processor 300 with regard to entities (electronic or human) external to Service processor 300. Interfaces 308 include mechanisms through which Service processor 300 can be incorporated into a host system. In one embodiment, service processor 300 also includes storage 309, which represents storage local to service processor 300. Service processor 300 may use storage 309 to store, for example, check values for programs, encryption keys, registration information for registered software agents, etc.

Service processor 300 includes patch agent 310, which represents one or more functional components that enable service processor 300 to provide in-memory patching. The functions or features of the components include, or are provided by, one or more means, including receiver 320, registration module 330, and patch application module 340. Each module may further include other modules to provide specific functionality. As used herein, a module refers to routine, a subsystem, etc., whether implemented in hardware, software, or some combination. One or more modules can be implemented as hardware while other(s) are implemented in software.

Note that service processor 300 may or may not be a single component. In one embodiment, service processor 300 represents multiple modules or entities that work in conjunction to provide in-memory patching. In one embodiment, service processor 300 represents one or more sub-components of a security or platform management entity.

Receiver 320 enables patch agent 310 to obtain a patch to apply to a program loaded in system main memory. In one embodiment, receiver 320 includes request process module 322 that receives requests for patching a program. The request is generally received from the patch source. Alternatively, patch agent 310 may auto-initiate the patching of a program loaded in memory. Receiver 320 includes patch access module 324, which provides the ability to obtain the patch information. The patch information may be received over a network, or placed in the system main memory or in a separate memory that is accessible to patch agent 310 via patch access module 324.

Registration module 330 enables patch agent 310 to register programs loaded in system main memory. Registered programs may provide memory location information regarding the program and its fix-ups. With registered programs, patch agent 310 can have information regarding the location of a program in memory when a patch is received. If a program is not registered, patch agent 310 can call memory scanner 332 to determine the location in memory of a program and salient portions of the program (i.e., the portion(s) to be patched). In one embodiment, memory scanner 332 includes a periodic function to scan memory and determine if one or more programs have viruses and require patching. These different types of memory scanning for different purposes could also be provided by different modules.

Patch application module 340 enables patch agent 310 to apply a patch to an in-memory program. The patch can be applied inline, or through symbol replacement, both discussed above. In one embodiment, one or more page of a loaded program is located in a virtual memory swap file, and should be loaded to accomplish the patching. Load page module 342 enables patch application module 340 to load one or more pages on which patch application operations should be performed. In one embodiment, load page module 342 includes a kernel resident component to allocate memory into the program's virtual memory space. Alternatively, patch application module 340 will also patch the page tables/page directory of the program. Symbol adjust module 344 enables patch application module 340 to perform a symbol modification on a program that cannot be patched with inline replacement. For example, a whole function may need to be replaced, or a large section of a function. The cost in terms of processor cycles and time to replace large amounts of code inline may be avoided by replacing an entire function with symbol replacement.

In one embodiment, patch application module 340 includes lock module 346 to provide locking of code during patching. Such locking of code may temporarily make a portion of code unavailable; however, such locking is not considered to be an interruption of the execution of the program. Such locking may make the portion of code unavailable for a number of execution clock cycles, rather than several seconds or longer as would typically result from reloading a program from storage into system main memory. Also, such locking locks only a routine or portion of code for a short period, and does not prevent execution of other portions of the program, which is in contrast to the case of stopping and reloading the program from storage. One method of providing such locking could be to mark a page as not present. Lock module 346 may write directly into a program's page table entries and set a "not present" bit in the table for the page of interest. Alternatively, lock module 346 may provide an instruction to the memory management to consider the page not present in memory. Changes are made to the page while it is marked as not present, and then it can be marked as present after the changes are made. In some cases, a translation look aside buffer (TLB) on the processor may need to be flushed when locking with the marking of a page as "not present" and "present." Note that in one embodiment, an item to be patched may be contained within a page, which can be marked not present. Alternatively, an item to be patched may not be able to be contained within a single page, and other locking methods may be employed (e.g., semaphores).

In one embodiment, patch application module 340 includes data locator 348, which provides the ability to determine the location of locatable data. As described previously, while patching is generally performed on code, data could also be the subject of in-memory patching as described herein. Some data is able to register with service processor 300 through data locator 348. Thus, although data is typically not locatable in memory, registered data may have a location and a size that can be known to service processor 300. Data locator 348 can then discover the data in memory and replace part or all of the data bytes.

The descriptions of agents or modules describe components that may include hardware, software, and/or a combination of these. In a case where a component to perform operations described herein includes software, the software data, instructions, and/or configuration may be provided via an article of manufacture by a machine/electronic device/hardware. An article of manufacture may include a machine readable medium having content to provide instructions, data, etc. The content may result in an electronic device as described herein, performing various operations or executions described. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 4:
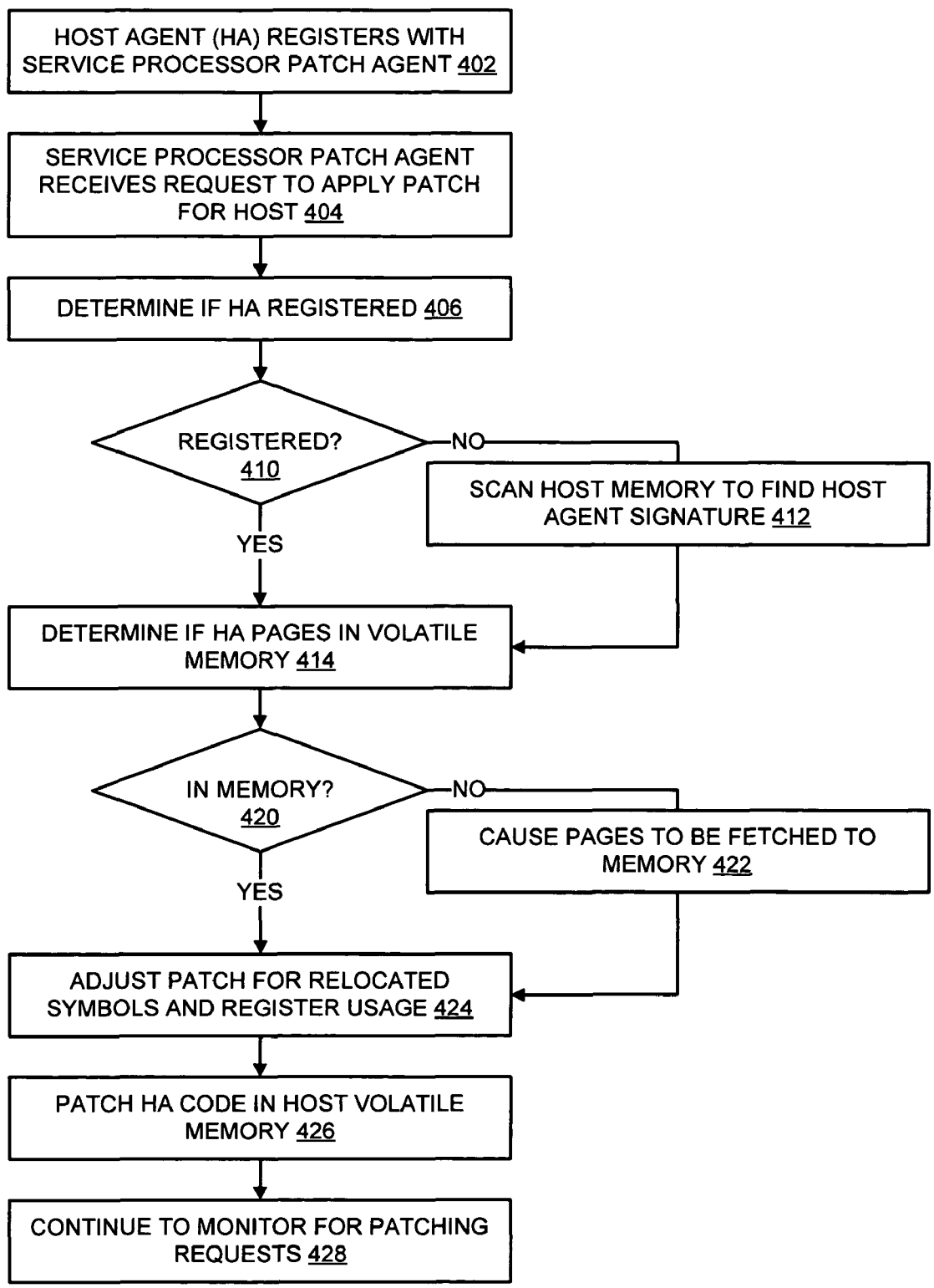
FIG. 4 is a flow diagram of an embodiment of a process for inline patching of a program in memory.

FIG. 4 is a flow diagram of an embodiment of a process for inline patching of a program in memory. A flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel. Additionally, one or more operations can be omitted in various embodiments of the invention; thus, not all operations are required in every implementation.

A host agent (HA) optionally registers with a service processor and/or its patch agent, 402. Not all HAs that will be patched by the patch agent need to be registered. The service processor patch agent receives a request to apply a patch to the HA, 404. The request may be from a network location (e.g., remediation entity 160 of FIG. 1), or from a location on the managed host that has the HA to be patched. The service processor receiving the request may include receiving an indication that a patch is available for the HA, in addition to direct requests to apply patches to an identified host agent. Where a direct request that identifies a host agent is not received, the service processor patch agent identifies the HA to be patched. In addition to receiving a direct request or an indication of an available request, the service processor may determine that the HA is to be patched, for example, through a scan of host main memory. The service processor may also receive an indication, for example, from a virus scanner, that the HA should be patched. Thus, receiving the request can refer to any number of methods in which the service processor determines or receives an indication that a patch is available or that a host agent should be patched.

The service processor identifies the HA through the indication received, or through its own determination. The service processor determines if the HA is registered, 406. If the HA is not registered, 410, the service processor can scan the host main memory to find the host agent signature, 412. After locating the identified HA, either through scanning host memory, or through looking up registration information for the HA, the service processor determines if the HA pages are in volatile memory, 414. As described previously, volatile memory can generally be understood herein as including virtual memory swap files; however, determining if the host memory pages are in volatile memory refers specifically here to whether the pages are accessible in the main memory and not in the virtual swap file. If one or more pages are not in memory, 420, the service processor causes the pages to be fetched to memory, 422. For example, the service processor can induce a page fault load the pages into memory. After the pages are determined to be in memory, or are fetched to be in memory, the service processor adjusts the patch for relocated symbols and use of specific dynamic registers, 424.

The adjusted patch code is then applied as the service processor patch agent patches the HA code in host volatile memory, 426. The patching may be any type of patching described herein. The service processor can then continue to monitor for patching requests for the patched HA, or for other HAs, 428.

FIG. 5 is a block diagram of an embodiment of a service processor that applies a code patch to a program. System 500 includes program 510 that is loaded into volatile memory, and patch 520 that is received and loaded into volatile memory. Service processor 530 may load patch 520 into volatile memory, or receive an indication that patch 520 is in memory. Service processor 530 includes patch agent 532 that applies the patching operations for service processor 530.

Program 510 includes an example of a program listing that needs patching, as described in more detail below. The source and some assembly are provided. The use of specific language constructs is solely for purposes of example and does not provide restriction; specific coding languages are not required, and similar techniques could be implemented with other system architectures. Thus, the source code could be produced in any language, and the x86 machine code is merely illustrative. The source illustrates the lack of bounds checking on line 8 of the code. The assembly illustrates an inline patch that could be applied to correct the bounds checking issue. The code is produced also in this description:

```
1:   // example code
2:   #include "header.h"
3:
4:   int main(int argc, char* argv[ ]) {
6:      int i;
7:      char charstring[10];           // Small buffer
8:      for(i=0;argv[0][i]!=NULL;i++) { // No bounds checking!
9:         charstring[i]=argv[0][i];    // Possible overflow!
0040104A  mov    edx,dword ptr [ebp+0Ch]
0040104A  jmp    (0080104A)            // Inline replacement
0040104D  mov    eax,dword ptr [edx]
0040104F  mov    ecx,dword ptr [ebp-4]
00401052  mov    edx,dword ptr [ebp-4]
00401055  mov    al,byte ptr [eax+edx]
00401058  mov    byte ptr [ebp+ecx-10h],al
10:     }
11:
12:     return 0;
13: }
[PATCH]
9:         if(i==10) break;              // Fix overflow
0080104A  cmp    dword ptr [ebp-4],0Ah
0080104E  jne    (00801054)
00801050  jmp    main+4Eh (0040105E)
00801054  mov    edx,dword ptr [ebp+0Ch]  // Replace removed line
<NEW CODE>                                 // Possibly insert new code
00xxxxxx  jmp    (0040104D)               // Jump/return to program
```

The inline replacement places a jump to the patch in place of the defective code routine that did not check bounds. Note that patch 520 is placed in memory, and relocation fix-ups are applied. Thus, the sequence of instructions is renumbered, according to the location the sequence receives when loaded into memory. However, as mentioned above, patch 520 could be compiled with reference to fixed addresses, and thus not need fix-ups to be applied. The line of code that began the improper sequence is deleted by patch agent 532 to allow the jump instruction to the patch to be inserted. The patch includes an example bounds check fix, and a jump return to the program at the location the patch was inserted. Note that in addition to the bounds checking, additional new code could be inserted in the patch. Note also that while a jump as illustrated returns execution to the instruction directly after the faulty code, the jump could return to any other location in the code. Thus, for example, if all code is good and new code simply needs to be added to patch the program, the patch could jump back to the normal instruction sequence. However, if some code is "bad" or should be skipped, the jump return could be to an instruction that effectively avoids the offending code. Below the source and some assembly for patch 520 is provided. The source and assembly for patch 520 are understood to have been relocated when loaded into memory and applied, as shown in the code above.

```
8:      for(i=0;argv[0][i]!=NULL;i++)    // No bounds checking!
9:         if(i==10) break;              // Fix overflow
0040104A  cmp    dword ptr [ebp-4],0Ah
0040104E  jne    main+42h (00401052)
00401050  jmp    main+56h (00401066)
10:     charstring[i]=argv[0][i];        // Overflow corrected
00401052  mov    edx,dword ptr [ebp+0Ch]
00401055  mov    eax,dword ptr [edx]
00401057  mov    ecx,dword ptr [ebp-4]
0040105A  mov    edx,dword ptr [ebp-4]
0040105D  mov    al,byte ptr [eax+edx]
00401060  mov    byte ptr [ebp+ecx-10h],al
```

Note that because the patch was idempotent to the original program, only replacing one line of the in-memory image with the patch pre-provisioned in another memory region, the program can continue running while the patch is applied. Thus, the patch can be applied without downtime, and the program execution will not be interrupted.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for patching a program, comprising:
   identifying, via a service processor, a first item of a program to be patched during a runtime of the program, the program included in a volatile memory of a host and executed by a host processor, wherein the host processor further executes an operating system (OS), and the runtime of the program comprises the program being executed via the OS;
   storing a patch for the first item in the volatile memory of the host; and
   editing the program included in the volatile memory of the host during the runtime of the program, via the service processor, to cause the program to implement the patch rather than the first item, wherein editing includes maintaining runtime state for the program by allowing the host processor to execute a second item associated with the program while the program is edited via the service processor.

2. The method of claim 1, wherein identifying the first item comprises:
   identifying a segment of program code.

3. The method of claim 1, wherein identifying the first item comprises:
   identifying a locatable data element.

4. The method of claim 1, wherein storing the patch in the volatile memory comprises:
   applying relocation fix-ups to the patch.

5. The method of claim 1, wherein storing the patch in the volatile memory comprises:
   modifying a symbol lookup table.

6. The method of claim 1, wherein editing the program to the patch further comprises:
   locking the first item associated with the program to prevent access to the first item;

directing the program to the patch while the first item is locked; and removing the lock condition on the first item.

7. The method of claim 6, wherein locking the first item comprises:
marking a memory page containing the first item as not present in the volatile memory;
directing the program to the patch; and
marking the memory page as present in the volatile memory after directing the program to the patch.

8. The method of claim 1, further comprising:
determining whether memory pages containing the program are loaded in volatile memory; and
if not, loading the memory pages into volatile memory prior to editing the program.

9. The method of claim 1, wherein the first item comprises a named function of the program, and wherein editing the program comprises:
replacing symbol references of the program from referencing the first item to referencing the patch.

10. The method of claim 1, further comprising:
reporting an outcome of patching the program to a remote administrator over a network connection inaccessible to software executing on the host processor that executes the program.

11. An article of manufacture comprising a machine-readable storage medium having content stored thereon to provide instructions to result in a device performing operations including:
receiving, at a service processor, a patch from a patch source to apply to a first item associated with a program loaded in a volatile memory of a host during a runtime of the program, wherein the program is executed by a host processor, wherein the host processor further executes an operating system (OS), and the runtime of the program comprises the program being executed via the OS;
replacing inline, via the service processor, the first item of the program loaded in the volatile memory of the host with a jump to the patch during the runtime of the program while maintaining runtime state for the program, wherein maintaining runtime state for the program includes allowing the host processor to execute a second item associated with the program while the program is edited via the service processor.

12. The article of manufacture of claim 11, wherein receiving the patch from the patch source comprises:
receiving the patch from platform hardware.

13. The article of manufacture of claim 11, wherein receiving the patch from the patch source comprises:
receiving the patch from a remote management console.

14. The article of manufacture of claim 11, wherein receiving the patch from the patch source comprises:
receiving the patch from a virtual machine executing on the platform hardware.

15. The article of manufacture of claim 14, wherein receiving the patch from the patch source comprises:
receiving the patch from a software component of the operating environment of the program.

16. The article of manufacture of claim 11, the content to further provide instructions for:
applying fix-ups to the patch.

17. A service processor comprising:
a receiver to
receive an indication to patch a first item of a program included in a virtual memory of a host, the program to be executed by a host processor, wherein the host processor further executes an operating system (OS),
identify the first item of the program in the virtual memory of the host, and
identify a patch for the first item of the program; and
a patch application module coupled to the receiver to
apply relocation fix-ups to the patch,
load the patch into a volatile memory of the host, and
edit the program included in the virtual memory of the host, during a runtime of the program, to be directed to the patch in place of a segment of the program without reloading the program into the virtual memory and while maintaining runtime state for the program, wherein maintaining runtime state for the program includes allowing the host processor to execute a second item of the program while the program is edited via the service processor and the runtime of the program comprises the program being executed via the OS.

18. The service processor of claim 17, wherein the patch application module to edit the program to be directed to the patch comprises the patch application module to further:
replace the first item of the program with a control flow transfer instruction to the patch to redirect the sequence of instructions to the patch;
copy the replaced instruction into the patch; and
insert a control flow transfer instruction at an end of the instructions of the patch to direct the sequence of instructions to return to the program.

19. The service processor of claim 18, wherein the patch application module to insert the control flow transfer instruction at the end of the instructions of the patch to direct the sequence of instructions to return to the program comprises the patch application module to further:
insert the control flow transfer instruction to direct the sequence of instructions to return to the program at a location in the program that avoids executing one or more instructions of the first item of the program.

20. The service processor of claim 17, further comprising:
a registration module to register the program prior to receiving the indication of the program to patch.

21. A system comprising:
a host processor;
a service processor to be in an environment securely separate from the host processor, the service processor to execute
a patch agent having a receiver to
receive an indication to patch a first item of a program included in a virtual memory of a host, the program to be executed by a host processor, wherein the host processor further executes an operating system (OS),
identify the first item of the program in the virtual memory of the host, and
identify a patch for the first item of the program,
a registration module to register the program prior to receiving the indication of the program to patch, and
a patch application module coupled to the receiver to
apply relocation fix-ups to the patch,
load the patch into a volatile memory of the host, and
edit the program included in the virtual memory of the host, during a runtime of the program, to be directed to the patch in place of a segment of the program without reloading the program into the virtual memory and while maintaining runtime state for the program, wherein maintaining runtime state for the program includes allowing the host processor to execute a second item of the program while the program is edited via the service processor and the runtime of the program comprises the program being executed via the OS; and
a flash storage coupled to the patch agent to store the registration information for the program.

22. The system of claim 21, the patch agent further comprising:
a memory scanner to scan the first item of the program for malware; and
if malware is detected, to initiate a patch to avoid malware code in the first item of the program.

23. The system of claim 21, wherein the receiver to receive the indication of the program to patch comprises the receiver to receive an indication of an update or patch available for the registered program.

* * * * *